United States Patent Office 2,812,570
Patented Nov. 12, 1957

2,812,570

HARDENED MOLDED ARTICLES

Hans Hermann Petersilie, Hamburg, and Erich Otto Zimmermann, Hamburg-Altona, Germany, assignors to Franz R. Lushas, New York, N. Y.

Original application October 26, 1951, Serial No. 253,304, now Patent No. 2,770,026, dated November 13, 1956. Divided and this application November 20, 1952, Serial No. 330,338

4 Claims. (Cl. 28—80)

This invention relates to material for use in connection with methods of molding articles and subsequently hardening the same. More particularly, the invention relates to material for use in connection with a method of molding a hollow article in accurate conformity with a given or selected configuration and to sheet material.

One object of the invention is to provide a novel and improved sheet material which possesses a high pliability thereby permitting to follow directly and closely even the most intricate contours, and which at the same time has sufficient form-preserving properties to retain faithfully any configuration that has been imparted to it during the molding operation.

Another object of the invention is to provide sheet material which is capable of being hardened directly or by the addition of hardening substances and which in its hardened condition constitutes a molded article of great resistance against unintentional deformations.

The material according to the invention lends itself to the manufacture of molded articles of the general type, above referred to, which are useful in many fields of application. A particularly useful and advantageous application is in the orthopedic field in which the invention permits to mold articles in perfect conformity with parts of the human body, such as arch support, lasts, sockets for artificial limbs, etc., at costs much lower than hitherto possible. Various other fields readily suggest themselves such as the formation of stage and film props, figures of any kind including statuary, parts of dolls, toys, tailor's dummies. Other useful fields are the reproduction of technical components and the production of dummies of such components for the purpose of study and analysis.

Other and further objects, features and advantages of the invention will be pointed out hereinafter and set forth in the appended claims forming part of the application.

The present application is a continuation-in-part of application Serial No. 173,116 filed July 11, 1950 and now abandoned and also a divisional application divided out of application Serial No. 253,304 filed October 26, 1951 and issued as Patent 2,770,026 on November 13, 1956.

The invention will be more fully explained in connection with the accompanying drawings in which several now preferred exemplifications of sheet material suitable for carrying out the method according to which the invention relates, are shown by way of illustration and not by way of limitation.

Figure 1:
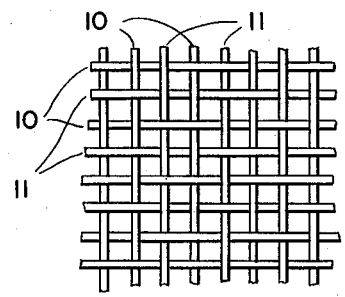
Fig. 1 is a plan view of a woven material to which the invention relates.

Referring now to the figures in detail, the sheet material according to Fig. 1 is shown as a web composed of elongated components of formable and form-preserving material, and components of non-formable and impregnable material.

In Fig. 1, the formable component comprises metal wires or artificial fibers 10 and the other component comprises textile threads 11. As will be noted, both the components 10 and 11 serve as warp and as weft or as woof elements.

Figure 2:
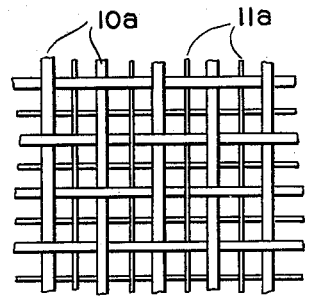
Fig. 2 is a plan view of a modification of woven sheet material, the web including flat metal strips.

Fig. 2 shows a web in which the formable and form-preserving material comprises flat metal strips 10a extending in both directions, and the non-formable impregnable material comprises threads 11a also extending in both directions. The textile threads 11a are fastened as a separate mesh on one side of the woven flat metal strips 10a. In the embodiment illustrated, the mesh of the non-formable, impregnable material, is fastened by interweaving or interlacing occasional threads 11a and strips 10a as indicated centrally on Fig. 2. However, a suitable adhesive may also be employed to fasten together the two components of the sheet material.

Figure 3:
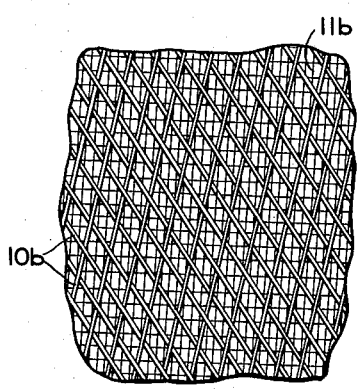
Fig. 3 is a plan view of still another modification of the sheet material in which a fabric adheres to one face of a wire screen.

The embodiment illustrated in Fig. 3 is a material which is composed of woven metal threads 10b forming a wire screen to one side of which a non-formable, impregnable component in the form of a fabric 11b is fixed for instance by means of an adhesive.

Figure 4:
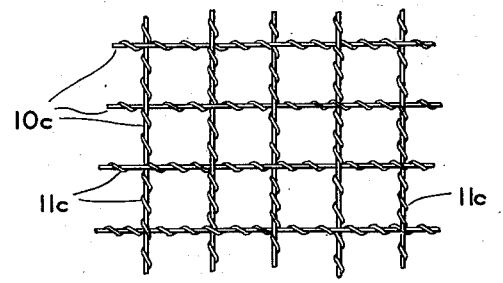
Fig. 4 is a plan view of another form of the invention wherein threads of impregnable material are wound about the elements of a wire screen.

Fig. 4 illustrates an embodiment wherein metal wires 10c are woven together and wherein threads or filaments 11c of yieldable, non-formable, impregnable material are loosely wound about the wires.

Figure 5:
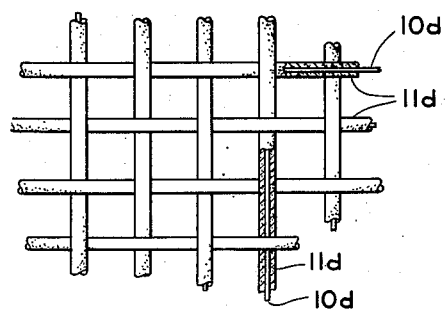
Fig. 5 is a plan view of still another form of a woven sheet material in which metal wires forming the warp and weft of the web are encased by textile fibrous.

Fig. 5 shows a web in which metal or plastic wires 10a run in the directions of the warp and the weft of the weave. All the wires are completely encased in a hose-like fashion by impregnable textile material 11d.

Figure 6:
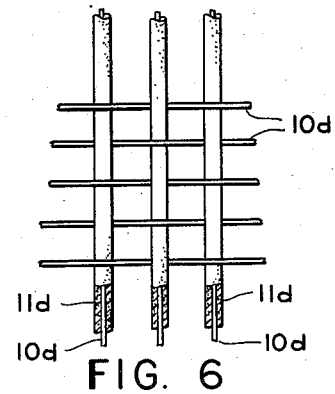
Fig. 6 is a plan view of a web similar to Fig. 5 in which the warp wires only are encased by textile fibers.

Fig. 6 shows a web similar to the weave of Fig. 5 with the difference that only the weft elements are encased by textile material 11d.

Figure 7:
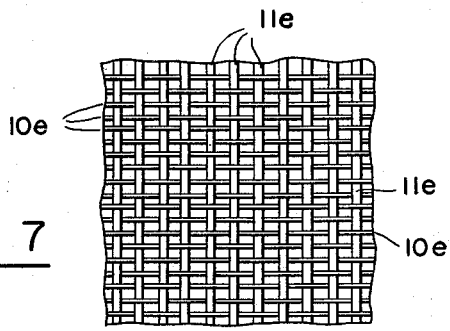
Fig. 7 is modification of a web according to the invention in which the warp is formed by metal portions and the weft by textile threads.

Fig. 7 shows a sheet material formed by weaving in one direction a plurality of metal wires 10e and in directly at right angle thereto a plurality of composite textile threads 11e.

While the use of textile fibers as the non-formable, impregnable component of the web is generally preferable, other materials can also be used. The wires of the web may be partly or completely encased with a coat of latex, rubber or a rubber composition, natural or synthetic; in particular with foam rubber. The coat may be 1 to 3 mm. thick and can be fastened by any suitable cement. It can also be mixed with textile fibers having a length of 2 to 5 mm. About one-fifth to one-third weight parts of fibers may be mixed with the rubber. Suitable polymerization products can also be sometimes used.

For the purposes of the invention, the sheet material must rigidly satisfy several conditions which will now be more fully explained.

As previously pointed out, the sheet material must enable the physician or other operator to follow easily and accurately intricate and strongly varying contours of the selected body. In practice, curves with a radius of approximately once or twice the thickness of the wires of the sheet material must often be formed and sharp opposite curves may follow one another. The sheet material must retain the molded shape until the hardening operation is completed. This latter operation will in some cases be carried out immediately following the molding operation but in other instances at a later date and after shipping the molded sheet material to a distant work shop. It will be appreciated that the molded sheet material must have sufficient stiffness to withstand a certain amount of handling.

To satisfy the aforementioned and related conditions, the formable and form-preserving component of the sheet material must be easily pliable but not elastic; it must have a smooth surface; a comparatively high tensile strength; about 25 to 30 kg./mm.$^2$; and it must also be rust resistant. We have found that wires made of an Al-Si-Mg alloy are well suitable. The thickness of the wires depends upon the specific application. We have found that for orthopedic purposes wires with a diameter of 0.5 to 0.7 mm. are suitable; for use in dental laboratories wires with a diameter of 0.1 to 0.2 mm.; and for technical purposes wires with a diameter of 1.00 mm. to several mm. In case formable components made of plastic material are employed, such components should have comparable properties.

The absorbent or impregnable component of the sheet material should have high absorption properties and a good tensile strength, not be subject to early aging and not tend to become brittle. Cotton threads or fibers have been found to be satisfactory. However, materials such as linen, jute, hair, felt and asbestos may also be used.

The web forming the sheet material must not be too loose or too tight. The warp or the weft or woof of the web must be so woven that the individual components of the material can easily slide relative to each other but remain in any relative position into which they are forced by the pressure exerted during the molding operation. In order words, the warp and weft wires or threads of the web will form very shallow sine lines. We have also found it to be advantageous to employ substantially square meshes, the width or length of which is approximately four to eight times the thickness of the wires.

When the textile fibers encase the wires in a hose like fashion, as is shown for instance in Figs. 5 and 6, the textile hose should be fairly loose so that the wires can freely slide within the same.

The hereinbefore described comparatively loosely woven sheet material can be easily bent by a gentle pressure into various curves, shapes and directions. Due to the relative displacements of the components of the web, the same can slide closer together in some areas and further apart in other areas.

In modern orthopedic practice the molding of the sheet material is usually commenced at a part of the human body which does not need correction, and is then progressed over the marginal portions toward the central area requiring correction. Upon completion of the molding operation, the sheet material is cut to size and a final formation is made if necessary.

The described sheet material permits performance of all these operations with great ease and accuracy. It also affords the important advantage that in contrast to the use of material such as plaster, the available molding time is unlimited, and that the molding operation can be interrupted and resumed at any time. Poorly formed portions can be remolded, and the material can be smoothed out again to be used for an entirely new molding operation.

Let it now be assumed that the molding operation is completed and that it is desired to transform the molded sheet material from its comparatively soft and yieldable condition into a substantially rigid condition.

This purpose may be accomplished by employing as formable component of the web a metal or other material that can be hardened by a suitable heat treatment such as tempering. While this method yields satisfactory results in certain instances, in many cases the use of hardening substances has been found to be preferable. More particularly, we have found it advantageous to employ hardening substances which can be softened again by chemical solvents rather than by the application of heat which is often impractical, and which harden again after evaporation of the solvent. The possibility of temporarily resoftening the articles in semi-finished or finished condition is of great practical importance, particularly in the orthopedic field. For instance, when it is desired to form a socket for an artificial leg, a reforming of the mold is frequently necessary to match accurately the shape of the leg stump under load. Orthopedic appliances generally require a reforming after a shorter or longer period of use due to changes in the contours of the corrected or supported body portions or in the location of the areas under pressure. The invention permits a reforming of the appliances at any time after completion.

It will be apparent from the previous description that the advantages of the possibility of a reforming operation at any stage of manufacture or after completion of the article are by no means limited to orthopedic appliances. A variaiton of the contours of the original mold is also often necessary when the invention is used for the construction of dummies of technical components, such as wings of aircraft or hulls of ships.

Referring now to the operational steps used for the completion of the article, it is generally advisable to subject the molded sheet material to a preliminary rigidification or hardening by dipping the same immediately after the formation into a suitable solution of a fast drying product or material. However, if it is practical to complete an article at or near the location where the molding operation has taken place, such preliminary hardening may be dispensed with and the article may be completed in a substantially continuous operation.

The finished article includes a plurality of layers or coats.

The application of each new layer is so conducted that the forces of contraction, etc. which become effective during the hardening of a new layer and which tend to deform the article in progress are less than the stability which is imparted to the article by the hardening of the preceding layer. In other words, the molded sheet material is gradually reinforced and stiffened.

For instance, after the preliminary hardening one side of the sheet material may be covered with a comparatively heavy layer or a pasty mixture including a filler and the other side with a thin layer or coat of the hardening solution used for the preliminary hardening. The forces of shrinkage developed by these two coats or layers then balance each other so that the molded sheet material retains its original contours.

If desired and necessary, several coats of the hardening solution may be applied to the side of the web opposite to the heavy layer to compensate for any tendency of the latter to cause deformations due to shrinking during the hardening process.

As to the hardening substances and the solvents for the same, these agents may be so selected that the application of a new layer will not re-soften the preceding layer thereby causing deformation of the article, and that each layer individually and also all the layers simultaneously can be temporarily resoftened by the application of suitable softening agents for the purpose of a renewed molding operation. This necessitates the use of softening agents which will affect one layer but not another and also of softening agents which are capable of affecting all the layers.

Figure 8:
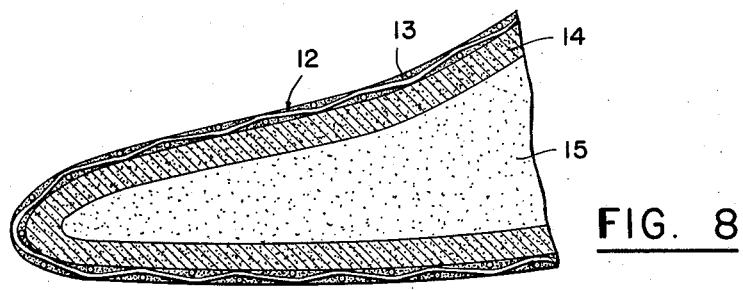
Fig. 8 is a fragmentary sectional view of a finished molded article according to the invention such as a last of an orthopedic shoe.

Referring now to the fragmentary section of a shoe last shown in Fig. 8. In this figure, the molded sheet material or web is generally designated by 12 and may correspond to the woven material of Fig. 6.

This shaped frame of sheet material, of the desired contour, is preliminarily hardened by dipping it into the hardening agent or solution, which will form a thin layer 13 substantially filling the meshes of the web that forms the frame. Such solution may be prepared from the following ingredients:

| | Parts by weight |
|---|---|
| Base—40% solution of nitrocellulose in ethyl acetate | 100 |
| Plasticizer—castor oil | 8 |
| Solvent—ethyl acetate | 20–25 |

The amount of the solvent is adjusted so that the viscosity of the hardening agent provides a liquid that forms a continuous thread or string when a rod or stick is pulled out therefrom for a distance of about 10–12 inches.

The dipped frame is removed from the aforesaid agent, and the coating sets in about 15 to 20 minutes. Since the nitrocellulose is soluble, for instance, in acetone or an ester of acetic acid, the molded hardened frame can be resoftened by immersion in such solvent or other suitable solvents that act as softeners.

After the hardening coat has set so that the frame has been rigidified, it is then coated with a layer, designated 14, of a putty-like plastic material that also hardens. Such putty-like material may be made from the following ingredients:

| | Parts by weight |
|---|---|
| Base—40% solution of nitrocellulose in ethyl acetate | 650 |
| Plasticizer—castor oil | 38–56 |
| Fillers—asbestos fibers | 200 |
| Dry powdered plaster of Paris | 65 |
| Wood flour | 80 |
| Pulverized cork | 60 |

The plastic material is prepared by making an intimate mixture of the asbestos fibers and the other dry ingredients. Then the nitrocellulose solution with the plasticizer incorporated therein is added to the dry mix while thoroughly agitating and mixing until the putty is attained. If the consistency thereof is too thick for manipulation, it may be thinned out by the incorporation of ethyl acetate.

The layer of the putty, applied in a thickness of about 3–5 mm., sets in about 4 hours.

We have found that either the wood flour or the pulverized cork, or both, may be omitted from the composition of the putty-like material, but the use of those ingredients is advantageous in that they reduce the density of the layer. The asbestos fibers provide the advantage that the layer is characterized by a continuity of structure that resists shrinking and cracking.

We have also found that glass fibers, such as glass wool, or powdered pumice stone may be used in place of the asbestos fibers. In general, the range of the dry ingredients to the 650 parts of the nitrocellulose solution and the 38–56 parts of the plasticizer is as follows:

| | Parts |
|---|---|
| Asbestos fibers (or powdered pumice stone, etc.) | 150–300 |
| Plaster of Paris | 50–130 |
| Wood flour | 20–180 |
| Powdered cork | 20–100 |

In the preparation of the hardening agent the amount of the plasticizer added to the 100 parts of the nitrocellulose solution can vary from 6 to 15 parts.

It will be understood, of course, that in making the hardening agent or the plastic putty-like material, suitable volatile solvents for nitrocellulose can be used in place of the ethyl acetate, as for example other esters of acetic acid or propionic such as butyl acetate, amyl acetate, etc. or ketones such as acetone or ethers; and also that any appropriate or suitable plasticizer may be used in place of the castor oil, such as benzyl benzoate, carbitol citrate, tricresyl phosphate, butyl oleate, diethyl phthalate, triphenyl phosphate, butyl stearate, etc.

It will also be understood that the nitrocellulose solution used as the base for the hardening agent or the putty-like material may be one in which the vehicle for the nitrocellulose is any suitable volatile solvent such as acetone, etc. which may also contain diluents such as benzene, toluene, etc. The ethyl acetate is used primarily because it has a pleasant odor.

The hereinbefore described hardening solution used for the preliminary hardening is also suitable and used to apply one or more thin coats to the molded frame on the side thereof opposite to layer 14. Those thin coats, the purpose of which has been previously explained, do not vary appreciably the molded contours. They may be applied by brushing with a brush.

If desired, the hardening or mesh-filling coat 13 can be formed of a resin or resinous material that is soluble or softenable by a type or class of solvents that does not exert any appreciable solvent action on layer 14. In such case each of the layers may be separately softened, if desired or necessary, by dipping the object into the particularly chosen solvent, or exposing the object to the vapors of such solvent. For example, if coat 13 is formed of an alcohol-soluble resin such as shellac or other alcohol-soluble product in which the nitrocellulose is insoluble, said coat 13 may be softened without affecting layer 14. Conversely, if a solvent of nitrocellulose which exerts no solvent or softening action on shellac is used, layer 14 may be softened while coat 13 remains unaffected. Then, too, if it be desired or become necessary to soften both coat 13 and layer 14 at the same time, such softening can be achieved by using a mixture of solvents of both classes, i. e., a common solvent for both types of resin. It will be apparent that the presence of plaster in the filler material does not prevent resoftening of layer 14 since due to the absence of water, the plaster remains in powder form.

The cavity left after the application of layer 14 may be finally filled with any suitable material 15 such as plaster or a resin mixture.

In the event the fragmentary body of Fig. 8 constitutes a part of the last of an orthopedic shoe, the top leather can be easily fitted thereupon by driving nails into the layer 14. The side of the last upon which the foot will rest and the contours of which are determined by the molding of the sheet material is finally covered with a suitable material, such as fabric, plastic or leather 16.

As will now be apparent, the method and the materials according to the invention permit a direct and inexpensive manufacture of highly accurate finished articles for orthopedic and other purposes which can be adapted to changing contours at any time after completion.

Figure 9:
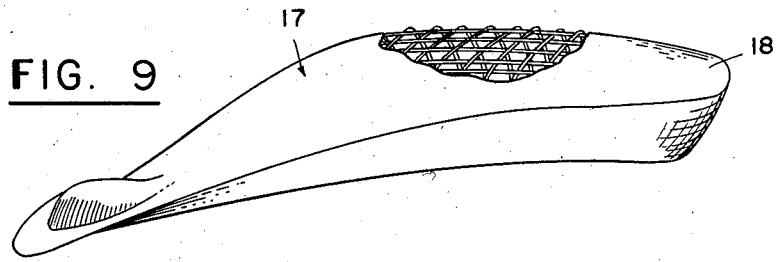
Fig. 9 is a perspective view, partly in section, of an orthopedic appliance according to the invention.

Fig. 9 shows as an example of the invention a metatarsal support generally designated by 17. To facilitate the understanding of this figure, the outer cover 18 is partly broken away and the woven frame of the support is shown without reinforcing hardened layers.

While the invention has been described in detail with respect to certain now preferred examples and embodiments of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. An article of manufacture comprising a contoured web woven of loosely interwoven metal wires as weft and warp components, hoses made of absorbent fibers each forming a covering for at least one of the web components running in one direction, a hardened coat substantially filling the interstices of said web, a comparatively heavy layer of a hardened material covering one side of the filled web, said layer including fibrous filler material, and at least one coat of a hardened material applied to the opposite side of the filled web in conformity with the contours of the same to embed the web between said coats, said coats and said layer being of a composition capable of being re-softened in a common volatile solvent.

2. An article of manufacture comprising a molded web woven of interwoven metal wires and textile fibers, a hardened inner coat substantially filling the meshes of said web, a comparatively heavy layer of a hardened material covering one side of said web, said layer including fibrous filler material, and at least one coat of a hardened material applied to the opposite side of said web in conformity with the contours of the same, said coats and said layer being of a composition capable of being re-softened in a common volatile solvent.

3. A woven material according to claim 1, wherein said metal wires are made of an Al-Si-Mg alloy and said absorbent fibers are in form of impregnable threads.

4. An article according to claim 1, wherein each of said warp and weft components is made of pliable substantially non-springy metal wires woven in a loose web in which the tension of the warp and weft components is such that the components are readily displaceable relative to each other in the plane of the web and at an angle thereto, but remain in any position of displacement.

References Cited in the file of this patent

UNITED STATES PATENTS

| | | |
|---|---|---|
| 1,965,542 | Colvin, Jr. | July 3, 1934 |
| 2,199,446 | Ruben | May 7, 1940 |
| 2,384,771 | Ryan | Sept. 11, 1945 |
| 2,408,368 | Brickman | Oct. 1, 1946 |
| 2,412,562 | Crawshaw | Dec. 17, 1946 |
| 2,569,764 | Jonas | Oct. 2, 1951 |